(12) United States Patent
Madej

(10) Patent No.: US 8,047,440 B2
(45) Date of Patent: *Nov. 1, 2011

(54) METHOD AND SYSTEM FOR DECODING A BARCODE

(75) Inventor: Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1305 days.

This patent is subject to a terminal disclaimer.

(21) Appl. No.: 11/137,871

(22) Filed: May 26, 2005

(65) Prior Publication Data

US 2006/0266837 A1 Nov. 30, 2006

(51) Int. Cl.
G02B 26/10 (2006.01)
G06K 7/10 (2006.01)
G06K 9/22 (2006.01)
G02B 5/00 (2006.01)
G06K 7/14 (2006.01)

(52) U.S. Cl. ......... 235/462.25; 235/462.32; 235/462.01; 235/454; 235/462.08

(58) Field of Classification Search ............. 235/462.25, 235/462.32, 462.01, 454, 462.28, 466, 467, 235/462.08
See application file for complete search history.

(56) References Cited

U.S. PATENT DOCUMENTS

| 3,986,000 | A | * | 10/1976 | McJohnson | 235/462.27 |
|---|---|---|---|---|---|
| 4,740,675 | A | * | 4/1988 | Brosnan et al. | 235/462.27 |
| 5,140,146 | A | * | 8/1992 | Metlitsky et al. | 235/462.26 |
| 5,250,791 | A | * | 10/1993 | Heiman et al. | 235/462.21 |
| 5,311,001 | A | * | 5/1994 | Joseph et al. | 235/462.07 |
| 5,457,309 | A | * | 10/1995 | Pelton | 235/462.28 |
| 5,463,211 | A | * | 10/1995 | Arends et al. | 235/462.27 |
| 5,734,152 | A | * | 3/1998 | Goren et al. | 235/462.27 |
| 5,923,023 | A | * | 7/1999 | Arends et al. | 235/462.25 |
| 6,036,091 | A | * | 3/2000 | Spitz | 235/462.25 |
| 6,036,094 | A | * | 3/2000 | Goldman et al. | 235/462.45 |
| 6,073,849 | A | * | 6/2000 | Colley et al. | 235/462.27 |
| 6,082,621 | A | * | 7/2000 | Chan et al. | 235/462.28 |
| 6,098,883 | A | * | 8/2000 | Zocca et al. | 235/462.27 |
| 6,328,213 | B1 | * | 12/2001 | He et al. | 235/462.25 |
| 6,461,007 | B1 | * | 10/2002 | Akaoka | 362/610 |
| 6,572,018 | B1 | * | 6/2003 | Lucera et al. | 235/472.01 |
| 6,712,274 | B2 | * | 3/2004 | Dvorkis et al. | 235/472.01 |
| 6,802,450 | B2 | * | 10/2004 | Cheung et al. | 235/462.25 |
| 6,938,824 | B2 | * | 9/2005 | Madej et al. | 235/462.16 |
| 7,281,659 | B2 | * | 10/2007 | Page | 235/462.07 |
| 7,506,816 | B2 | * | 3/2009 | Olmstead | 235/462.01 |
| 2002/0070278 | A1 | * | 6/2002 | Hung et al. | 235/472.01 |
| 2002/0118779 | A1 | * | 8/2002 | Wu et al. | 375/345 |

(Continued)

FOREIGN PATENT DOCUMENTS

EP 1883893 1/2010

(Continued)

OTHER PUBLICATIONS

Office Action dated Jul. 31, 2009 in related China case 200680022875.5.

Primary Examiner — Daniel Walsh

(57) ABSTRACT

Described is a method and system for obtaining a digitized representation of a bar code, estimating a set of parameters from the digitized representation and acquiring a waveform representation of the bar code based on at least one parameter in the set of parameters.

22 Claims, 5 Drawing Sheets

U.S. PATENT DOCUMENTS

| | | | |
|---|---|---|---|
| 2002/0139851 A1* | 10/2002 | Hecht | 235/454 |
| 2002/0162890 A1* | 11/2002 | Tsi et al. | 235/462.16 |
| 2002/0196979 A1* | 12/2002 | Yen et al. | 382/190 |
| 2003/0066891 A1* | 4/2003 | Madej et al. | 235/462.25 |
| 2004/0011871 A1* | 1/2004 | Harper et al. | 235/462.01 |
| 2004/0129784 A1* | 7/2004 | Iwaguchi et al. | 235/462.16 |
| 2004/0206821 A1* | 10/2004 | Longacre et al. | 235/462.07 |
| 2005/0006479 A1* | 1/2005 | He et al. | 235/462.25 |
| 2006/0065734 A1* | 3/2006 | Sackett et al. | 235/462.25 |
| 2006/0192011 A1* | 8/2006 | Madej | 235/462.27 |
| 2006/0231629 A1* | 10/2006 | Massieu | 235/462.32 |
| 2006/0266837 A1* | 11/2006 | Madej | 235/462.25 |
| 2007/0069027 A1* | 3/2007 | Madej | 235/462.32 |
| 2007/0119938 A1* | 5/2007 | Madej | 235/462.08 |
| 2007/0119943 A1* | 5/2007 | Madej | 235/462.25 |

FOREIGN PATENT DOCUMENTS

| | | | |
|---|---|---|---|
| JP | 10293809 A | * | 11/1998 |
| WO | 2006127195 | | 11/2006 |

* cited by examiner

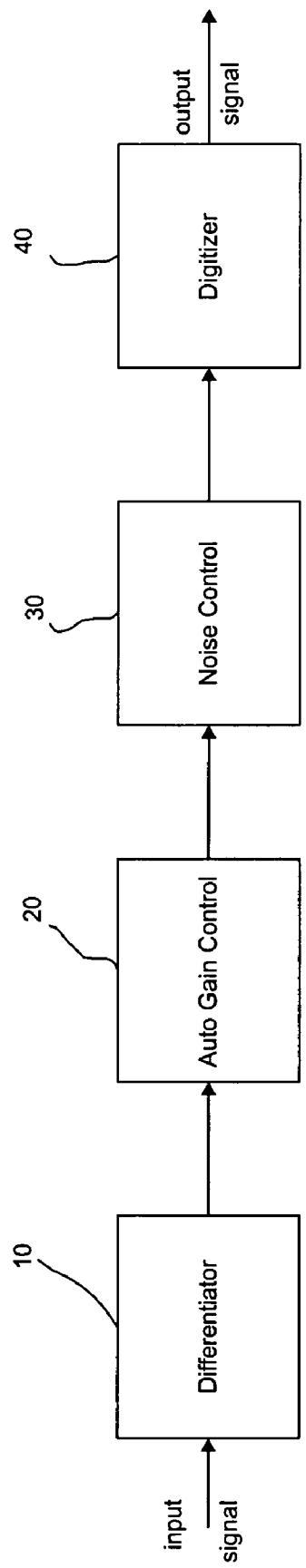
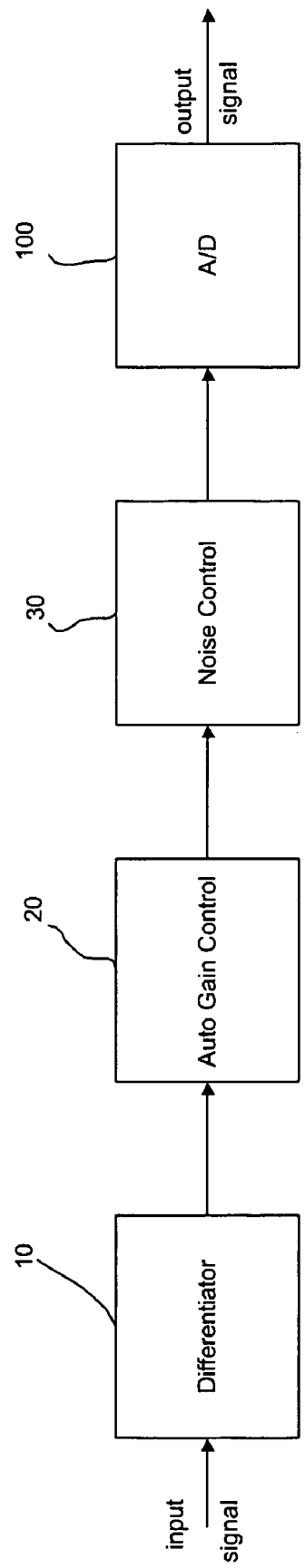
Fig. 2
Fig. 4

US 8,047,440 B2

METHOD AND SYSTEM FOR DECODING A BARCODE

BACKGROUND INFORMATION

Bar codes have become a part of everyday life. Most, if not all, consumer items have a bar code either on the item or attached to the item in some manner (e.g., a hang tag with a bar code). Organizations such as corporations and hospitals attach bar codes to physical property in order to keep track of the location of this physical property. Warehouses use bar codes on items, pallets, rows of racks, etc. to locate items and for inventory control. There are numerous other examples of bar codes being used for different purposes.

In each of these instances, it is not the act of attaching the bar code to the item that produces the favorable results, but the act of reading the bar code attached to the item and processing the information contained in the bar code, e.g., reading a bar code on a grocery item and charging the customer the correct amount for the grocery item. However, in many instances, the reading of the bar code is not an easy or straightforward task to accomplish. There may be instances where there is a problem with the bar code itself, e.g., the bar code image is not sufficiently sharp or has become damaged in some way, or instances where the reader causes a problem, e.g., the bar code reader cannot be placed close enough to the bar code to obtain a sharp image. If the bar code cannot be read, the myriad of benefits associated with bar coding items will not be realized.

SUMMARY OF THE INVENTION

A method for obtaining a digitized representation of a bar code, estimating a set of parameters from the digitized representation and acquiring a waveform representation of the bar code based on at least one parameter in the set of parameters.

A system including a bar code scanner acquiring information from a bar code and outputting a digitized representation of the bar code and a CPU receiving the digitized representation and estimating a set of parameters from the digitized representation, wherein the CPU directs the bar code scanner to acquire a waveform representation of the bar code based on at least one parameter in the set of parameters.

A bar code scanner including a scanning engine to collect data from a bar code, a digitizer to generate a digitized representation of the bar code from a first set of collected data and an analog-to-digital (A/D) converter to sample a waveform from a second set of collected data, wherein a sampling rate of the A/D converter is based on a parameter estimated from the digitized representation.

BRIEF DESCRIPTION OF THE DRAWINGS

FIG. 2 shows a block diagram of exemplary front end processing components of a laser bar code scanner according to the present invention.

FIG. 4 shows a block diagram of exemplary front end processing components of a laser bar code scanner collecting and pre-processing waveform data for a blur decoder according to the present invention.

DETAILED DESCRIPTION

Figure 1:
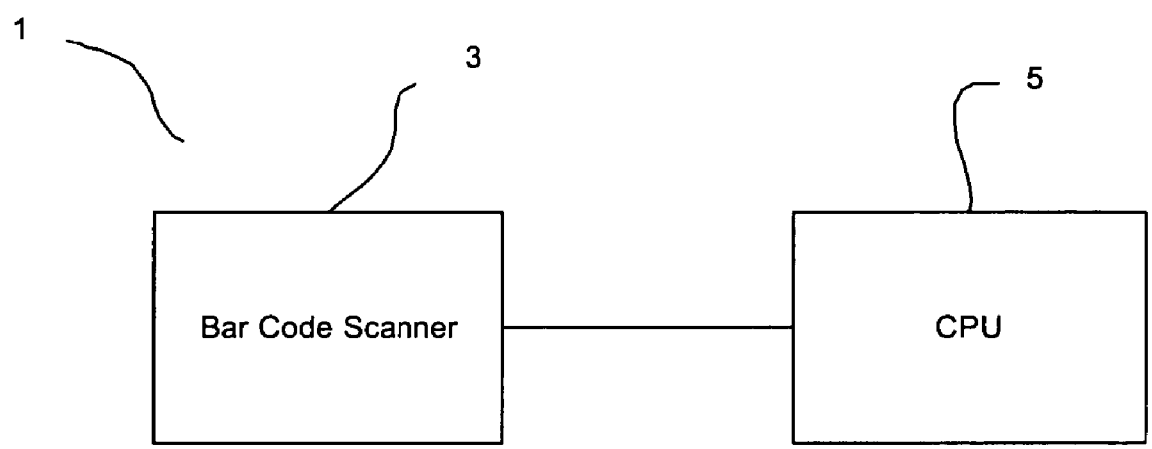
FIG. 1 shows an exemplary system for detecting and decoding a bar code.

The present invention may be further understood with reference to the following description and the appended drawings, wherein like elements are provided with the same reference numerals. The present invention discloses a system and method for decoding information contained in a bar code. The exemplary embodiments will be described with reference to a laser bar code scanner. However, those of skill in the art will understand that the present invention may also be utilized with other types of bar code scanning (e.g., imaging, etc.).

FIG. 1 shows an exemplary system 1 for detecting and decoding a bar code. A bar code scanner 3 collects data from a bar code. The bar code scanner 3 may be any type of bar code scanner, e.g., a laser bar code scanner, an imaging bar code scanner, etc. A laser bar code scanner collects data points using a reflection of a laser beam off of the bar code, while an imaging bar code scanner collects an image of the bar code. The bar code scanner 3 collects the data from the bar code (e.g., data points, image, etc) and may also perform some front end or pre-processing of the data. The bar code scanner 3 then sends either the raw data or the pre-processed data (in the case where the bar code scanner 3 includes front end processing capabilities) to a memory of a CPU 5. The CPU 5 includes a decoding engine which accesses the memory and completes the decoding of the bar code by processing the data forwarded by the bar code scanner 3 to extract the information contained in the bar code.

Figure 3:
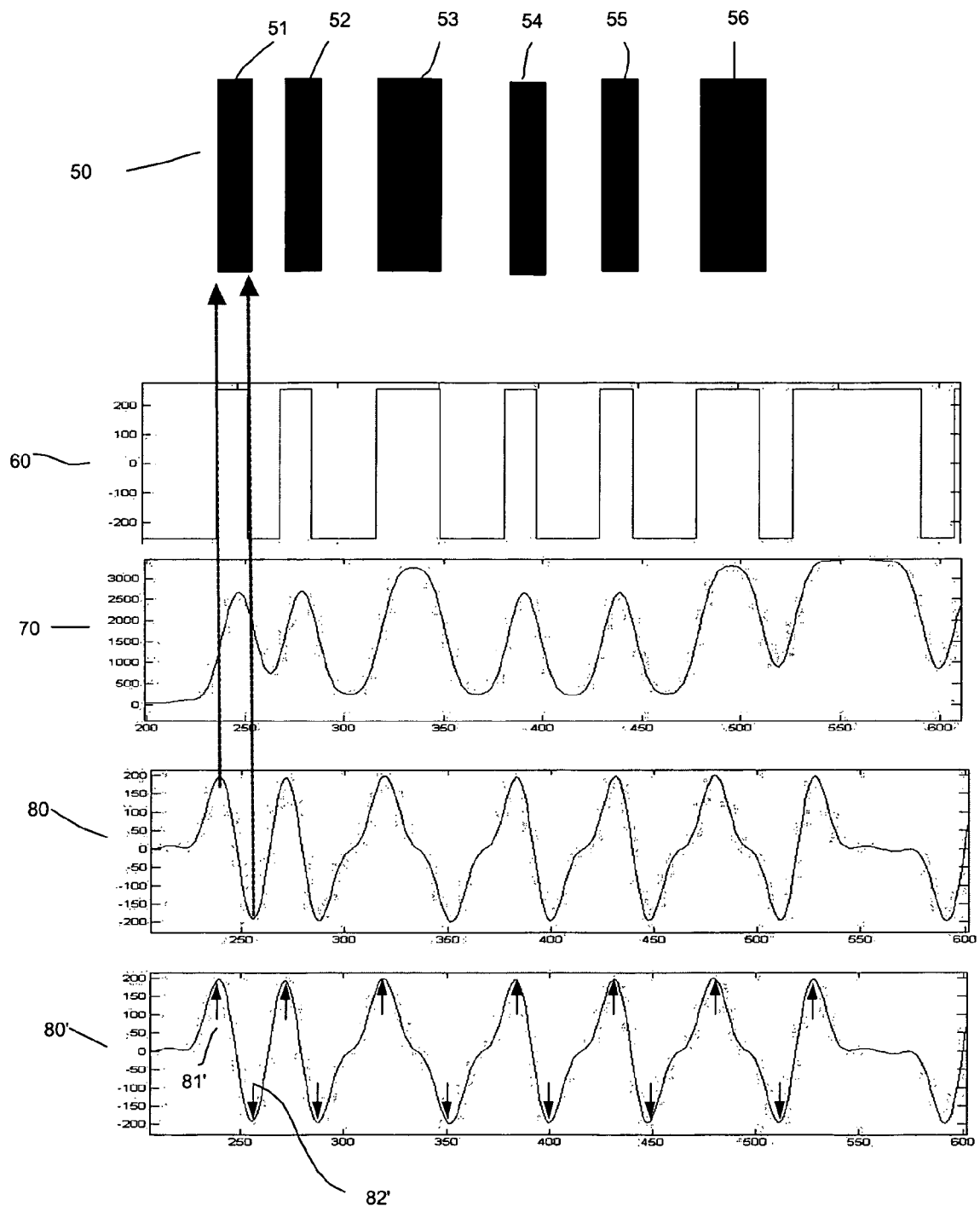
FIG. 3 shows an exemplary series of signals showing the laser bar code signal as it is processed according to the present invention.

FIG. 2 shows a block diagram of exemplary front end processing components 10-40 of a laser bar code scanner. The front end processing components 10-40 of FIG. 2 will be described in conjunction with an exemplary series of signals shown in FIG. 3. Initially, FIG. 3 shows a bar code pattern 50 which will be scanned by a laser bar code scanner. The bar code pattern 50 includes a series of bars 51-56. The laser bar code scanner scans the bar code 50. A typical laser bar code scanner generates several tens of thousands of data points per scan (e.g., 30,000 data points/scan) and makes multiple scans per second (e.g. 30 to 500 scans per second, with 100 scans being common for a hand held scanner).

The reflectance pattern 60 of FIG. 3 shows an inverted reflectance pattern of the bar code pattern 50 as scanned by the laser bar code scanner. This reflectance pattern 60 is convoluted with the laser beam of the laser bar code scanner to yield a laser signal 70 which is the input signal shown in FIG. 3.

Referring to FIG. 2, the input signal (e.g., laser signal 70) is input into a differentiator 10 to yield a differentiated signal which is a first derivative of the input signal. An exemplary differentiated signal 80 output by the differentiator 10 is shown in FIG. 3. The differentiated signal 80' is a repeat of the exemplary differentiated signal 80, except that it uses arrows to show the various peaks and valleys of the differentiated signal 80'. These peaks and valleys correspond to the start and end of a bar. For example, the peak 81' corresponds to the start of the bar 51 and the valley 82' corresponds to the end of the bar 51. The purpose of determining the start and end of bars will be described in greater detail below.

Referring back to FIG. 2, the differentiated signal 80 is input into an auto gain control ("AGC") element 20 and a noise control element 30. Those of skill in the art will understand that these elements 20, 30 are signal conditioning elements which condition the signal for further processing. Those of skill in the art will also understand that the elements 20, 30 may contain a variety of components used for signal processing, e.g., noise control element 30 may include a series of low pass and high pass filters to filter out noise in various bandwidths.

The conditioned signal is then input into an analog digitizer 40 which is used to detect the edges (e.g., the peaks and valleys) of the signal. Then, by measuring a time elapsed between consecutive detected edges, the data, referred to as a Digital Bar Pattern ("DBP"), is created and is the output signal of the digitizer 40 shown in FIG. 1. The DBP may be the signal transmitted to the memory of a CPU (e.g., CPU 5 of FIG. 1) for further decoding. In an alternative embodiment, a digital device may also be used to generate a DBP equivalent. However, in either case, the DBP or DBP equivalent will show the edges of the bars in the bar code pattern.

However, as described above, for a variety of reasons the data collected by the laser bar code scanner may not be used to fully decode the scanned bar code. Such a bar code will be described as a blurred bar code. The blurred bar code refers to any bar code which cannot be fully decoded using the above described method, whether the problem is related to the bar code itself, the circumstances of the scanning, the scanning equipment, etc. The most common type of problem is related to the range of the scanner. For example, as a laser scanner gets farther away from the bar code, the higher the magnitude of blur. However, even though the term blurred bar code and blur decoder are used, there may be other reasons for not decoding the bar code. The exemplary embodiments of the present invention may also be applied in these types of situations. For example, the bar code may not be blurred, but may have a low contrast, a printing error or be damaged in some manner. As will be seen from the exemplary embodiments, the present invention is directed at collecting a waveform for the bar code. The collected waveform may be used for other purposes and may be fed into various back end decoders to correct any number of errors with the scanner or the bar code.

Thus, the present invention includes a system and method for additional processing of a signal to correct the problem of a blurred bar code, referred to as a blur decoder. The blur decoder may be used, for example, to extend the reading range of a scanner. Those of skill in the art will understand that the present invention may be used with any type of scanner and CPU decoding engine. However, the exemplary embodiment of the present invention is particularly useful for scanners and CPUs which have limited random access memory ("RAM") and processing power, e.g., a scanner with 16-32 KB of RAM and CPU power of 10 MIPS (Million Instructions per Second). The blur decoder includes the collection of a waveform which represents the bar code. This type of scanning arrangement does not have enough RAM to collect an entire waveform representing a bar code and lacks the processing power to process it in real time. However, a fraction of the waveform can be acquired and processed by a blur decoder to correct a blurred bar code.

FIG. 4 shows a block diagram of exemplary front end processing components of a laser bar code scanner collecting and pre-processing waveform data for a blur decoder. As shown in FIG. 4, the hardware includes the same differentiator 10, AGC 20 and noise control 30 as shown in FIG. 2. Each of these components perform the same the function as described above with reference to FIG. 2. Thus, the various exemplary signals 60-80 shown in FIG. 3 would be the same for the hardware shown in FIG. 4.

However, the exemplary embodiment of the bar code scanner front end processing components also includes an analog-to-digital ("A/D") converter 100 which is used to sample the signal, e.g., the differentiated signal 80. As will be described in greater detail below, the blur decoder takes advantage of information included in the DBP to collect a limited representation of a signal waveform and use it to enhance the blur decoding. A scanner equipped with components to perform output of a DBP may be converted to also include waveform collection for blur decoding by adding an A/D converter. Comparing FIGS. 2 and 4 shows that components 10-30 are identical and the only difference is the digitizer 40 (FIG. 2) and the A/D converter 100 (FIG. 4). Thus, adding an A/D converter at the output of the noise control element 30 in parallel with the digitizer 40 would accomplish combining the functionality described with reference to the hardware of FIGS. 2 and 4. Those of skill in the art will understand that other hardware combinations may also be used to accomplish this functionality and that other hardware and/or logic may be required to fully implement all the described functionality.

As described above, the A/D converter 100 is used to sample an incoming signal. The sampling of the A/D converter 100 will depend on the scanning frequency and scan angle. For example, a hand held scanner with a scan rate of 100 scans/second may have a sampling rate of 1 MHz. The output of the A/D converter 100 is sent to the memory of a CPU (e.g. CPU 5 of FIG. 1) for further decoding. In one embodiment, the CPU may be equipped with a camera port. In this embodiment, the A/D converter 100 may be connected to the camera port to allow the direct transfer of the waveform to the CPU memory through a DMA.

Figure 5:
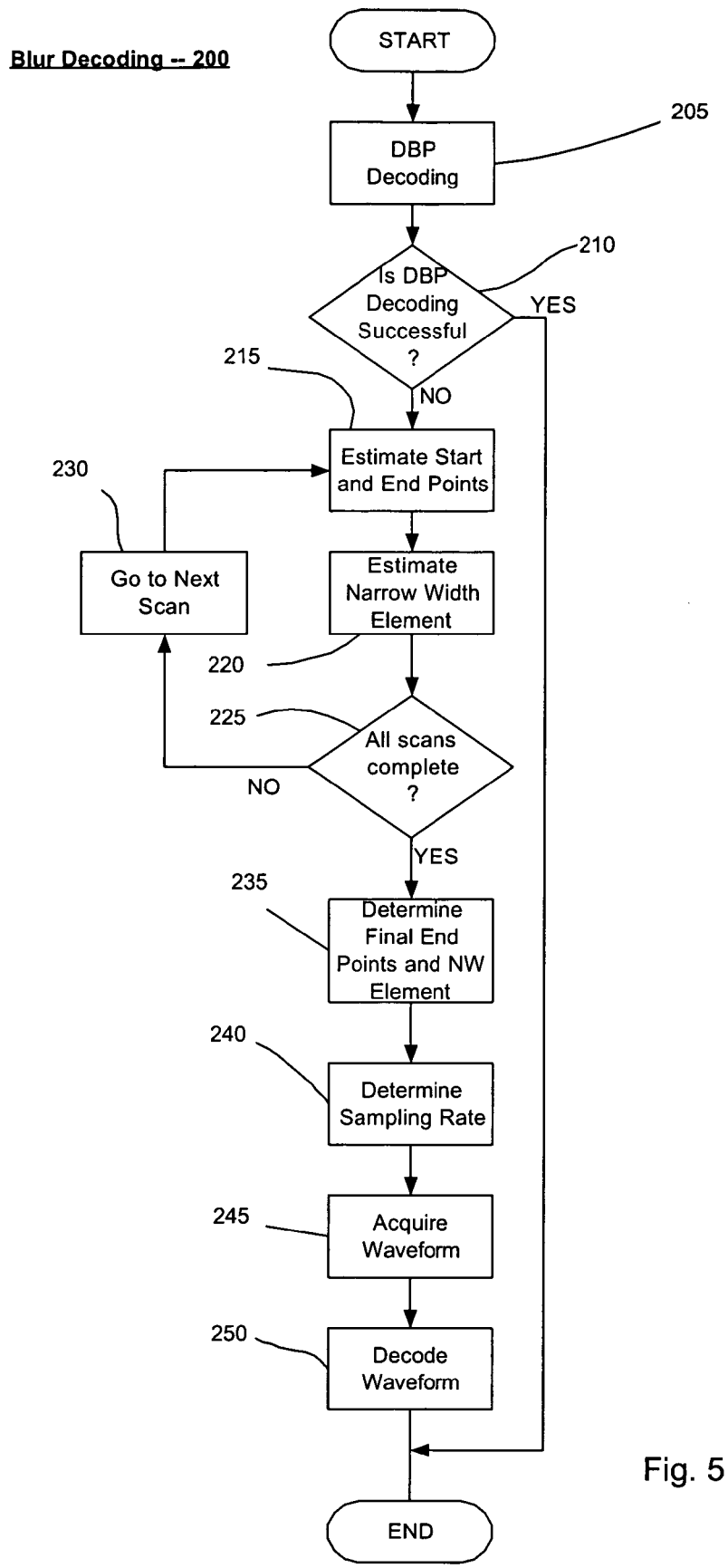
FIG. 5 shows an exemplary process for decoding a bar code including blur decoding according to the present invention.

FIG. 5 shows an exemplary process 200 for decoding a bar code including blur decoding. In step 205, the bar code is scanned and the DBP decoding is performed. The DBP decoding includes the collection of the bar code data, the pre-processing described above with reference to FIG. 2 to obtain the DBP and the CPU processing to complete the DBP decoding. The process then continues to step 210 to determine if the DBP decoding is successful. If the DBP decoding is successful, (i.e., the bar code can be fully decoded), then all the information contained in the bar code has been extracted and the process is complete. Thus, the portion of the process 200 related to blur decoding is not required.

However, if the DBP decoding is not successful, the process continues to perform the steps associated with the blur decoding. As described above, the blur decoding leverages information collected during the DBP decoding, even when that decoding is not successful. The DBP data is used to estimate certain bar code parameters including boundaries of the bar code within a scan line for both the forward and backward scanning direction and an approximated width of a narrow element of the bar code.

In step 215, the bar code start and end points are estimated. This estimation is based on margins of the bar code located by the DBP decoding which performs a center out margin search resulting in a pair of DBP elements which are believed to be a first (Left margin) and a last (Right margin) DBP elements representing the bar code in a train of DBP elements. The start and end points of the bar code may then be estimated using the following rules:

$$\text{Start\_Point} = \sum_{i=1}^{Left\_Margin} DBP_i$$

$$\text{End\_Point} = \sum_{i=\text{Left\_Margin}+1}^{\text{Right\_Margin}} DBP_i + \text{Start\_Point} + 8 * NW$$

As can be seen from the above rules, the margins determined by the DBP decoding are used to estimate the start and end points of each of the bar code. It should be noted that there is an additional factor in the estimation of the end point described as 8*NW. The factor is added because a digitizer (e.g. digitizer 40 in FIG. 2) may miss an even number of narrow elements located at the end of a bar code. The NW is the narrow element width and the integer 8 is the longest even-length sequence of consecutive narrow elements for a one dimensional bar code symbology.

Furthermore, it should be noted that this estimation is valid when the signal-to-noise ratio is below a noise immunity of the digitizer, which depends on the digitizer thresholds used during edge detection. For digitizers using multiple thresholds, it is preferable to use the least sensitive threshold to provide for the best noise performance.

Figure 6:
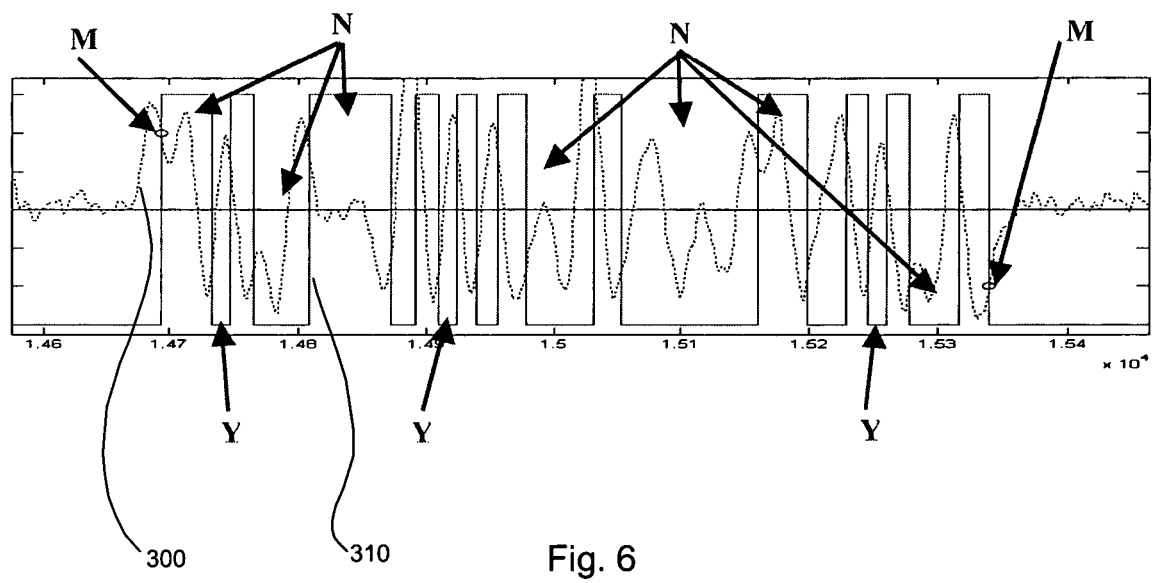
FIG. 6 shows an exemplary differentiated signal and its associated DBP created for an exemplary bar code.

The process then continues to step 220 where the size of the narrow elements is estimated based on the DBP elements located between the Left and Right margins. The purpose of step 220 is to estimate the narrowest width element (bar) in the bar code. FIG. 6 shows an exemplary differentiated signal 300 (indicated by the dotted line) and its associated DBP 310 (indicated by the solid line) for an exemplary bar code. FIG. 6 shows that the DBP decoding correctly located the two margins as indicated by the M on the left and right of the DBP 310. If the margin estimation is incorrect and the smallest width element falls outside the estimated margins, the estimation could be in error. However, as will be described below, other methods generally assure that this anomaly will be avoided.

FIG. 6 also shows that multiple narrow elements (marked by the letter N) were not detected by the DBP decoding. Thus, if these elements were the narrow width element, the estimation could be in error. However, again, the following will describe methods that assure that this anomaly will be avoided.

FIG. 6 also shows sequence of elements of the DBP 310 which are Wide-Narrow-Wide (marked as the letter Y). A narrow element located between a pair of wide elements is generally immune to blurring and noise because of a high signal amplitude and a steep signal slope. In a blurred bar code, these elements are estimated as the smallest among the DBP elements with an estimated width of about 1.5*NS, where NS=Narrow element size. The factor of 1.5 is due to the distortion of element width which may be caused by the convolution with the laser beam as described above with reference to FIG. 2. The width of these type of elements remain stable even if the noise amplitude exceeds the amplitude of the signal representing sequences of consecutive narrow elements.

If the bar code is less blurred, then the smallest elements of the DBP correspond to 1*NS. For example, it may be possible to resolve all the DBP elements to correspond to bar code elements, but their width may be distorted by convolution with the laser beam. In the case of a high blur or a moderate blur, the estimated smallest elements of the DBP sequence between the Left and Right margins should represent NS with an error of approximately +50%. This estimation is more than sufficient for further processing.

It should be noted that a very noisy non-blurred bar code may yield splits, by splitting single bars (or spaces) into several DBP elements. It may be considered that splits will create a large error in the narrow width estimation because the smallest elements come from splits rather than actual narrow elements. However, it has been observed that splits are more likely to occur in wide bars and spaces rather than narrow and these splits tend to have width values close to the narrow width element. Thus, even when splitting occurs, the narrow width estimation may be useful.

Another method of estimating the expected value of the smallest DBP element is to use a histogram of DBP widths rather than finding the smallest width of the set of DBP widths. In addition, to minimize the chance of an incorrect estimation of start and end points and the width of the narrow element, the estimation may be repeated multiple times using data from successive scans.

The process then continues to step 225 to determine if the end point and narrow width estimations have been completed for all the scans. As described above, the laser bar code scanner will complete multiple scans. If the estimations are not completed for each of the scans the process will go to step 230 where the data for the next scan will be analyzed as described above in steps 215 and 220.

If the data for all the scans have been analyzed, the process continues to step 235 where the final values of the estimated end points and narrow width element are determined. These final values may be determined using, for example, median filtering of the stored estimates for each scan. It should also be noted that separate calculations may be carried out for forward scans and reverse scans since it is possible the values will vary.

Once step 235 is complete, enough information has been gathered to acquire the bar code waveform for the purpose of blur decoding. The process then continues to step 240 where the sampling rate is determined, i.e., the sampling rate of the A/D converter 100 as described with reference to FIG. 4. The sampling rate used to collect the waveform is determined using:

$$S_f = ((S_{f0} * \text{Min } N)/NW) * 2$$

where,
$S_{f0}$=sampling rate used during the initial N scans;
Min N=PPM limit of high blur decoder;
NW=estimated narrow width element.

A high blur digitizer requires that a narrow element be represented by at least two samples, e.g., the PPM limit is 1.5. However, for different blur decoders different limits may be selected. The factor of 2 is selected to minimize any adverse effects of the NW estimation.

Once the sampling rate has been selected, the process continues to step 245 where the waveform is acquired. As described above, an advantage of the present invention is that only a partial waveform may be collected. Thus, the exemplary embodiment of the present invention limits the number of acquired samples between the estimated start and end points. In addition to the setting of the sampling rate, the A/D converter 100 may be controlled by a timer to be enabled only for a fraction of the scan line. The timer may control the A/D converter based on the following:

$$\text{Enable Time} = \text{Start Point}/S_{f0}$$

$$\text{Disable Time} = \text{End Point}/S_{f0}$$

where,
Start Point=Estimated Start point;
End Pont=Estimated End point;
$S_{f0}$=sampling rate used during the initial N scans.

The scanning may then begin to acquire the waveform. The waveform samples may be stored in an acquisition buffer which is a memory area which is also used to store the DBP. This buffer is normally several Kbytes and has sufficient size to hold the portion of the bar code waveform used for decoding. For example, in an exemplary embodiment, it was determined that a differentiated signal may be represented by 6-bit values of amplitude, meaning that a single byte may be used to represent a sample point.

In the case of a standard Uniform Product Code ("UPC") bar code, 200 bytes are sufficient to store the waveforms under the assumption that two samples of the narrow element are collected. In the case of a relatively large 20 character long C39 bar code, it has been determined that the waveform may be stored using just 600 bytes. As described above, there may be separate calculations for forward and reverse scanning directions and, if the memory is sufficient, a waveform for each direction may be acquired.

After the waveform has been acquired, the process continues to step 250 where the blur decoding of the waveform is completed. For those who are interested in exemplary manners of blur decoding, they can refer to U.S. Pat. No. 6,328,213 issued on Dec. 11, 2001 to He et al. As described above, the collected data will exclude the quiet area outside the margins and will include only a portion of the entire bar code, thereby increasing the accuracy of the blur decoder. In addition, since very few samples represent the fragment of a scan signal, the time needed to execute the blur decoder is short.

After the blur decoding is complete, the process 200 should have extracted all the information from the bar code, even blurred bar codes because of the use of the blur decoding portions of the process.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method of decoding a bar code comprising:
obtaining a digitized representation of a bar code with a bar code scanner, wherein the digitized representation is a Digital Bar Pattern (DBP) that includes at least a measure timed elapsed between consecutive detected edges of a differentiated signal related to an inverted reflectance pattern of the bar code; performing DBP decoding to determine whether the bar code can be fully decoded based on the DBP; estimating a set of parameters from the digitized representation; and only if the DBP decoding is unsuccessful, acquiring a waveform representation of the bar code based on at least one parameter in the set of parameters, the acquiring including selecting a sampling rate for acquiring the waveform representation, the sampling rate being based on at least one parameter in the set of parameters, and wherein a sample point in the waveform representation being represented by a multiple-bits value, and decoding the bar code using the estimated set of parameters and the sampling rate of the acquired waveform representation.

2. The method of claim 1, wherein the set of parameters includes one of a start point of the bar code, an end point of the bar code and a narrow width element of the bar code.

3. The method of claim 1, wherein the acquiring step includes the substep of:
selecting a sampling enable time for acquiring the waveform, the sampling enable time being based on the at least one parameter in the set of parameters.

4. The method of claim 1, further comprising the step of:
decoding the bar code using the digitized representation.

5. The method of claim 1, further comprising the step of:
decoding the bar code using the waveform.

6. The method of claim 1, further comprising:
sending the waveform to a decoder to decode the information contained in the bar code.

7. The method of claim 1, wherein the acquiring step comprises:
acquiring a waveform representation of the bar code based on at least one parameter in the set of parameters after a failure in decoding the Digital Bar Pattern.

8. The method of claim 1,
wherein the set of parameters includes a start point of the bar code and an end point of the bar code.

9. The method of claim 6, wherein the decoder is selected from a plurality of decoders, at least one of the decoders being used to solve a reading error for the bar code.

10. A bar code system, comprising:
a bar code scanning acquiring information from a bar code and outputting a digitized representation of the bar code, wherein the digitized representation is a Digital Bar Pattern (DBP) that includes at least a measured time elapsed between consecutive detected edges of a differentiated signal related to an inverted reflectance pattern of the bar code;
a CPU receiving the digitized representation, performing DBP decoding to determine whether the bar code can be fully decoded based on the DBP,
and estimating a set of parameters from the digitized representation of the bar code ,only if the DBP decoding is unsuccessful,
with a sampling rate based on at least one parameter in the set of parameters, and wherein a sample point in the waveform representation is represented by a multiple-bits value, and wherein the bar code system is operable to decode the barcode using the estimated set of parameters and the sampling rate of the acquired waveform representation.

11. The system of claim 10, wherein the bar code scanner is one of a laser bar code scanner and an imaging bar code scanner.

12. The system of claim 10, wherein the set of parameters includes one of a start point of the bar code, an end point of the bar code and a narrow width element of the bar code.

13. The system of claim 10, wherein the at least one parameter is used to select a sampling enable time for the bar code scanner to acquire the waveform.

14. The system of claim 10, wherein the CPU receives the waveform and decodes the bar code.

15. The system of claim 10,
wherein the CPU directs the bar code scanner to decode the Digital Bar Pattern, and directs the bar code scanner to acquire a waveform representation of the bar code based on at least one parameter in the set of parameters if the decoding of the Digital Bar Pattern fails.

16. The system of claim 10,
wherein the set of parameters includes a start point of the bar code and an end point of the bar code.

17. A bar code scanner, comprising:
a scanning engine to collect data from a bar code;
A digitizer to generate a digitized representation of the bar code from a first set of collected data from the barcode, wherein the digitized representation is a Digital Bar Pattern (DBP) that includes at least a measured time elapsed between consecutive detected edges of a differentiated signal related to an inverted reflectance pattern of the barcode, and wherein the scanning engine bar code scanner performed a DBP decoding to determine whether the bar code can be fully decoded based on the DBP;

and an analog-to-digital (A/D) converter to sample a waveform from a second set of collected data from the bar code, wherein a sampling rate of the A/D converter is based on a parameter estimated from the digitized representation, after DBP decoding, and wherein the waveform is acquired only if DBP decoding is unsuccessful, and wherein the bar code scanner is operable to decode the bar code using the sampling rate and the sampled waveform.

18. The bar code scanner of claim 17, wherein the bar code scanner is one of a laser bar code scanner and an imaging bar code scanner.

19. The bar code scanner of claim 17, further comprising: a differentiator to generate a differentiated signal from the first set of collected data, wherein the output of the differentiator is sent to the digitizer and the A/D converter.

20. The bar code scanner of claim 19, further comprising: one of an auto gain control element and a noise control element to condition the differentiated signal.

21. The bar code scanner of claim 17, wherein the parameter a width of a narrowest element in the digitized representation.

22. The bar code scanner of claim 17, wherein the A/D converter is enabled for only a portion of a scan line of the bar code scanner, the portion being determined based on an estimated start point of the bar code and an estimated end point of the bar code.

* * * * *